(12) United States Patent
Short et al.

(10) Patent No.: US 10,318,023 B2
(45) Date of Patent: Jun. 11, 2019

(54) DETERMINING A POSITION OF AN INPUT OBJECT

(71) Applicant: Hewlett-Packard Development Company, L.P., Houston, TX (US)

(72) Inventors: David Bradley Short, San Diego, CA (US); Jinman Kang, San Diego, CA (US); Ben Wynne, San Diego, CA (US); Jamie Etcheson, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/501,274

(22) PCT Filed: Aug. 5, 2014

(86) PCT No.: PCT/US2014/049657
§ 371 (c)(1),
(2) Date: Feb. 2, 2017

(87) PCT Pub. No.: WO2016/022097
PCT Pub. Date: Feb. 11, 2016

(65) Prior Publication Data
US 2017/0220141 A1    Aug. 3, 2017

(51) Int. Cl.
*G06F 3/042* (2006.01)
*G06F 3/0354* (2013.01)
*G06F 3/03* (2006.01)
*G06F 3/0346* (2013.01)
*G06F 3/038* (2013.01)

(52) U.S. Cl.
CPC ........ *G06F 3/03545* (2013.01); *G06F 3/0304* (2013.01); *G06F 3/0308* (2013.01); *G06F 3/0325* (2013.01); *G06F 3/0346* (2013.01); *G06F 3/0383* (2013.01)

(58) Field of Classification Search
USPC ............... 345/156, 158, 173, 175, 179, 183
See application file for complete search history.

(56) References Cited

U.S. PATENT DOCUMENTS 6,714,311 B2   3/2004  Hashimoto
6,917,033 B2   7/2005  Hendriks et al.
7,599,561 B2  10/2009  Wilson et al.
(Continued)

FOREIGN PATENT DOCUMENTS

CN   103003778   3/2013
CN   202976035   6/2013
(Continued)

OTHER PUBLICATIONS

Kim et al., "Retrodepth: 3D Silhouette Sensing for High-precision Input on and Above Physical Surfaces," CHI 2014, 2014, pp. 1377-1386, ACM.
(Continued)

*Primary Examiner* — Thuy N Pardo
(74) *Attorney, Agent, or Firm* — Trop Pruner & Hu PC

(57) ABSTRACT

Data is captured by an image capture device of an input object that has a first retroreflective pattern and a second, different retroreflective pattern on a surface of the input object. A position of the input object in three dimensions is determined based on the received data.

19 Claims, 4 Drawing Sheets

(56) References Cited

U.S. PATENT DOCUMENTS

| | | | |
|---|---|---|---|
| 7,710,391 B2 | 5/2010 | Bell et al. | |
| 7,874,681 B2 | 1/2011 | Huebner | |
| 8,121,640 B2 | 2/2012 | Russ et al. | |
| 8,199,117 B2 | 6/2012 | Izadi et al. | |
| 8,350,829 B2 | 1/2013 | Miyazaki et al. | |
| 8,736,583 B2 | 5/2014 | Anderson et al. | |
| 9,195,351 B1* | 11/2015 | Rosenberg | G06F 1/1626 345/173 |
| 2001/0050669 A1 | 12/2001 | Ogawa | |
| 2002/0015159 A1 | 2/2002 | Hashimoto | |
| 2005/0078092 A1 | 4/2005 | Clapper | |
| 2006/0084039 A1 | 4/2006 | Ryokai et al. | |
| 2008/0018591 A1 | 1/2008 | Pittel et al. | |
| 2008/0165162 A1 | 7/2008 | Zloter et al. | |
| 2011/0128218 A1* | 6/2011 | Kroeker | G06F 3/0428 345/156 |
| 2011/0128219 A1* | 6/2011 | Sirotich | G06F 3/0428 345/156 |
| 2011/0205189 A1* | 8/2011 | Newton | G06F 3/0428 345/175 |
| 2011/0234542 A1* | 9/2011 | Marson | G06F 3/0418 345/175 |
| 2011/0242006 A1 | 10/2011 | Thompson et al. | |
| 2011/0242054 A1 | 10/2011 | Tsu | |
| 2012/0013530 A1 | 1/2012 | Tsuboi | |
| 2012/0040755 A1 | 2/2012 | Pryor | |
| 2012/0068974 A1* | 3/2012 | Ogawa | G06F 3/041 345/175 |
| 2012/0162214 A1 | 6/2012 | Chavez et al. | |
| 2012/0249482 A1 | 10/2012 | Kiyose | |
| 2013/0077236 A1 | 3/2013 | Becze et al. | |
| 2013/0100022 A1 | 4/2013 | Thompson et al. | |
| 2013/0249791 A1* | 9/2013 | Pryor | G06F 3/042 345/156 |
| 2013/0257777 A1* | 10/2013 | Benko | G06F 3/03545 345/173 |
| 2015/0199018 A1* | 7/2015 | Kim | G06F 3/017 345/156 |
| 2015/0205390 A1* | 7/2015 | Yeh | G06F 3/0383 345/179 |
| 2015/0363035 A1* | 12/2015 | Hinckley | G06F 3/0383 345/173 |

FOREIGN PATENT DOCUMENTS

| | | |
|---|---|---|
| TW | 201222343 A | 6/2012 |
| WO | WO-2005/072500 A2 | 8/2005 |
| WO | WO-2013040691 | 3/2013 |
| WO | WO-2013/108031 A2 | 7/2013 |

OTHER PUBLICATIONS

Shahram Izadi et al., "C-Slate: A Multi-Touch and Object Recognition System for Remote Collaboration using Horizontal Surfaces,", 2007, pp. 3-10, IEEE.

Wong, "Low-cost Visual/inertial Hybrid Motion Capture System for Wireless 3D Controllers," THESIS ~ University of Waterloo 2007, pp. 1-100.

Scheer et al., Abstract Only, Large area indoor tracking for industrial augmented reality, IEEE, 2010 (3 pages).

* cited by examiner

DETERMINING A POSITION OF AN INPUT OBJECT

BACKGROUND

A user input device can be used by a user to provide an input to an electronic device, such as to cause a task to be performed at the electronic device. Examples of user input devices include a mouse device, a keyboard, a touchpad, a touchscreen display, a game controller, and so forth. A touchpad or touchscreen display detects a touch by a user on a touch-sensitive surface. This touch input can be interpreted as an input event that is sent to an electronic device.

BRIEF DESCRIPTION OF THE DRAWINGS

Some implementations are described with respect to the following figures.

DETAILED DESCRIPTION

Users can use touch-based input devices to provide input to an electronic device. A touch-based input device can include a touchpad, a touchscreen display, or any other input device that includes a touch-sensitive surface. A touch-sensitive surface is able to detect user touches or swipes on the touch-sensitive surface, which are interpreted as input events that are communicated to the electronic device. A touch-sensitive surface can rely on use of capacitive sensing of touches or swipes.

In some cases, an input device with a touch-sensitive surface may not be easily usable with an electronic device. For example, the electronic device can be a desktop computer that has a display that is oriented generally vertically, which makes touch-based input on the display inconvenient for a user. Also, a touch-sensitive surface relies on a user actually touching the touch-sensitive surface (using either a finger or a stylus) for an input to be recognized. Thus, a touch-sensitive surface may not be able to recognize an input object (e.g. a stylus or user finger) that hovers above the touch-sensitive surface.

In accordance with some implementations, to increase flexibility, an input system is provided that uses an image capture device to recognize an input gesture made using an input object. As examples, the input object can include a stylus, which can be any item that can be held by a user. For example, the stylus can be a wand, a digital pen, and so forth. As other examples, an input object can include a user's finger(s).

Figure 1:
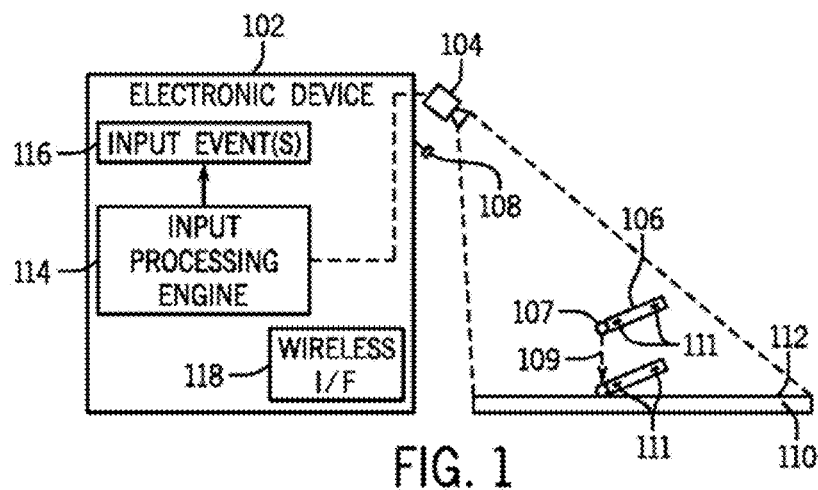
FIG. 1 is a schematic diagram of an example arrangement that includes a user input system associated with an electronic device, according to some implementations.

FIG. 1 illustrates an example arrangement that includes an electronic device 102 that is associated with a user input system that allows a user to provide an input to the electronic device 102. The user input system includes an image capture device 104 that can include a camera or an arrangement of cameras, which can capture an image of an input object 106 that is being manipulated by a user. In the example of FIG. 1, the input object 106 is a stylus. In other examples, the input object 106 can include a user's finger.

In the ensuing discussion, reference is made to examples where the input object 106 is a stylus. Note that techniques or mechanisms according to some implementations can be applied to other types of input objects.

In accordance with some implementations, the stylus 106 is provided with a retroreflective material 111 provided on an outer surface of the stylus 106. A retroreflective material reflects incident light along a path that is parallel to the path of the incident light. In other examples, the retroreflective material can be a substantially retroreflective material, where light is reflected back along a path that is approximately parallel to the path of the incident light. A path of the reflected light is approximately parallel to the path of the incident light if the path of reflected light is within 20° of being parallel with the path of the incident light.

Incident light can be produced by a light source assembly 108, which can include one or multiple light sources. The light produced by the light source assembly 108 can be in a specified range of wavelengths. For example, the range of wavelengths of light produced by the light source assembly 108 can be 825 millimeters to 875 millimeters. In other examples, the light produced by the light source assembly 108 can be in another wavelength range.

In examples where the input object 106 includes a user's finger, the retroreflective material can be provided as a sleeve (or sleeves) around the users finger.

In the example of FIG. 1, the retroreflective material 111 includes first and second retroreflective patterns on two end portions of the stylus 106. The first and second retroreflective patterns can be different from each other to allow a distinction between the upper portion of the stylus 106 and the bottom portion of the stylus 106.

In the example of FIG. 1, a surface structure 110 over which the stylus 106 can be used. The stylus 106 can be held in a hover position above the surface structure 110, where the stylus 106 hovers above the surface structure 110 without touching an upper surface 112 of the surface structure 110. In some examples, the surface structure 110 can be a mat. In other examples, the surface structure 110 can be the top of a table or desk, or any other structure on which a user can work.

In some implementations, the surface structure 110 does not have capacitive touch-sensitive elements. Thus, movement of the stylus 106 is detected based on images of the stylus 106 captured by the image capture device 104.

In some implementations, the stylus 106 can be provided with an element that can interact with the upper surface 112 of the surface structure 110. For example, a tip portion 107 of the stylus 106 can be a moveable portion, which can be in the form of a spring-loaded plunger, for example. When pressed against the upper surface 112 of the surface structure 110, the plunger moves in the stylus 106. The movement of the plunger can be communicated by the stylus 106 to the electronic device 102. As an example, as shown in FIG. 1, the electronic device 102 can include a wireless interface 118 that is able to communicate wirelessly with a corresponding wireless interface (not shown in FIG. 1) in the stylus 106. The wireless interface 118 can be a radio frequency (RF) interface, an IR interface, and so forth. As examples, the wireless interface 118 can be a Bluetooth interface, a near field communication (NFC) interface, or any other type of wireless interface.

In other examples, it is noted that the stylus 106 can omit the moveable tip portion 107.

The stylus 106 can also include a user-activatable element, such as a button or a touch-sensitive region. Actuation of the user-activatable element can be communicated wirelessly from the stylus 106 to the electronic device 102.

User input can be based on images of the stylus 106 captured by the image capture device 104 and actuation of the moveable tip portion 107 and/or actuation of the user-activatable element. In some examples, when the user-activatable element is depressed as the stylus 106 is moved, the stylus 106 can be used to perform spray painting onto a displayed image. More specifically, an indication of activation of the user-activatable element can be received. Based on the received indication, painting of a region of a displayed image with a particular color (or colors) corresponding to a time interval during which the user-activatable element of the input object remains activated is performed.

An image of the stylus 106 captured by the image capture device 104 can be communicated by the camera to an input processing engine 114 in the electronic device 102. The input processing engine 114 along with the image capture device 104, the light source assembly 108, and the stylus 106 can be part of the user input system.

An "engine" as discussed in the present disclosure may include hardware or a combination of hardware and programming to implement the functionalities of the respective engine. Such combinations of hardware and programming may be implemented in a number of different ways. For example, the programming for an engine may include executable instructions stored on a non-transitory machine-readable storage medium and the hardware for the engine may include processor(s) to execute those instructions. In such examples, the machine-readable storage medium may store instructions that, when executed by the processor(s), implement functionalities of the engine. A processor can include a microprocessor, microcontroller, programmable integrated circuit, programmable gate array, or any combination of the foregoing.

The input processing engine 114 can apply image processing to images of the stylus 106 captured by the input capture device 104. The input processing applied by the input processing engine 114 can detect a position of the stylus 106 in three dimensions. The three dimensions can include the x, y, and z axes, where the x and y axes can lie in a horizontal plane, for example, while the z axis extends in a vertical plane, for example. More generally, the x and y axes lie in a first plane, and the z axis is perpendicular to both the x and y axes. The z axis corresponds to a depth of the stylus 106 with respect to the upper surface 112 of the surface structure 110. FIG. 1 shows the stylus 106 moved (at 109) along the z axis.

In some examples, the image capture device 104 can include a camera that can capture depth information of an object, including the stylus 106. For example, the camera can be an infrared (IR) camera, which includes a depth sensor. In image captured by the IR camera can include both the IR image as well as depth information of an object captured by the IR camera.

In this way, a position of the stylus 106 in the x, y, and z axes can be determined by the input processing engine 114. Based on determined position(s) of the stylus 106, the input processing engine 114 can produce a respective input event (s) 116. The input event(s) 116 can be used by other logic in the electronic device 102, such as machine-readable instructions (e.g. software or firmware), a processor, and so forth.

Note that the input processing engine 114 can determine a position of the stylus 106 in three dimensions even when the stylus 106 hovers over the surface structure 110. This determination can be made without physical interaction between the stylus 106 and the surface structure 110, while the stylus 106 hovers over the surface structure 110.

Figure 2:
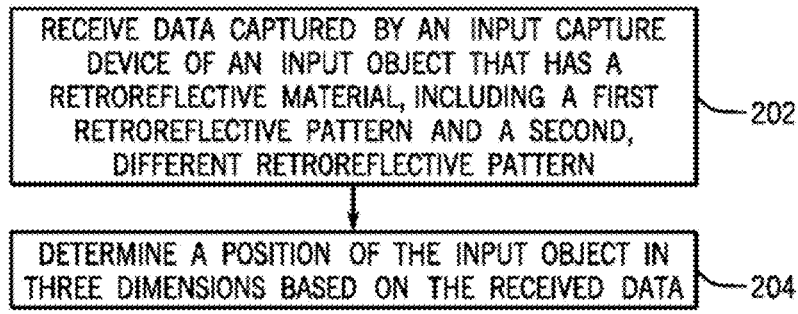
FIG. 2 is a flow diagram of a process according to some implementations.

FIG. 2 is a flow diagram of a process according to some implementations. The process of FIG. 2 can be performed by a system, which can include an electronic device, an arrangement of electronic devices, a processor, or an arrangement of processors. In some examples, the system that can perform the process of FIG. 2 is the electronic device 102 of FIG. 1. More specifically, in some examples, the process of FIG. 2 can be performed by the input processing engine 114.

The system receives (at 202) data captured by the image capture device 104 of an input object (e.g. the stylus 106) that has a retroreflective material on a surface of the stylus 106. As noted above, the retroreflective material on the outer surface of the stylus 106 can include a first retroreflective pattern and a second, different retroreflective pattern. The different patterns can have different shapes, different sizes, or can have any other characteristic that can distinguish one retroreflective pattern from another retroreflective pattern. In some examples, the first retroreflective pattern can be provided at an upper portion of the stylus 106, while the second retroreflective pattern can be provided at a bottom portion of the stylus 106, such as near or on the tip portion 107. The use of different retroreflective patterns allows for a distinction to be made between the top and bottom portions of the stylus 106.

The system determines (at 204) a position of the input object in three dimensions based on the received data. Based on the position of the input object, or on a gesture that can be derived based on multiple positions of the input object as determined by the system, one or multiple input events (e.g. 116 in FIG. 1) can be generated by the system.

In alternative implementations, it is noted that the stylus 106 can also be used in conjunction with a touch-sensitive surface, such as a touchpad or touchscreen display. In such implementations, the determined position of the stylus 106, and more specifically, the determined position of the tip portion of the stylus 106, can be used to perform unintended touch rejection. Unintended touch rejection is used to reject any touch that is not intended to be a touch. For example, a user holding the stylus 106 may inadvertently touch a touch-sensitive surface, such as with the user's palm or knuckle.

In some implementations, based on the determined position of the stylus 106, a region having a spatial relationship with respect to the stylus 106, such as the tip portion of the stylus 106, can be identified. For example, the determined region can be a region around the tip portion of the stylus 106. As other examples, the determined region can be a distance away from the tip portion of the stylus 106. The determined region can be an inactive region, where any touch in the inactive region is to be disregarded. Unintended touch rejection is thus performed with respect to the determined region.

Figure 3:
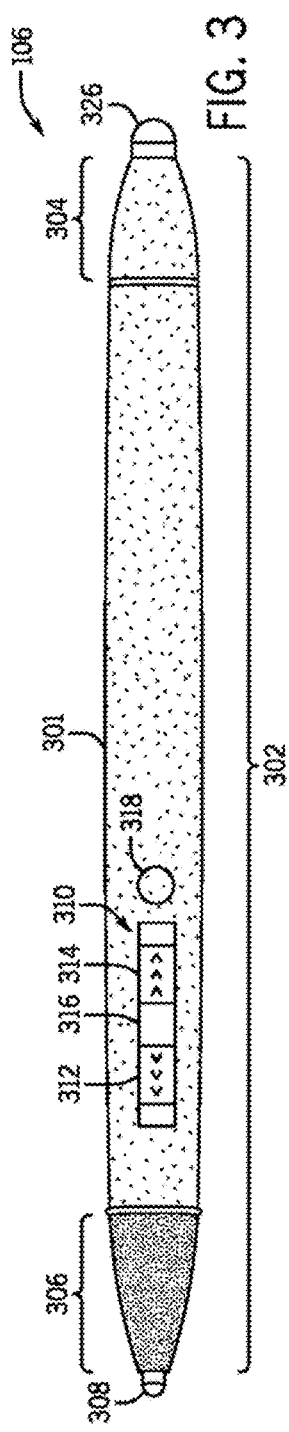
FIG. 3 is a side view of a stylus according to some implementations.
Figure 4:
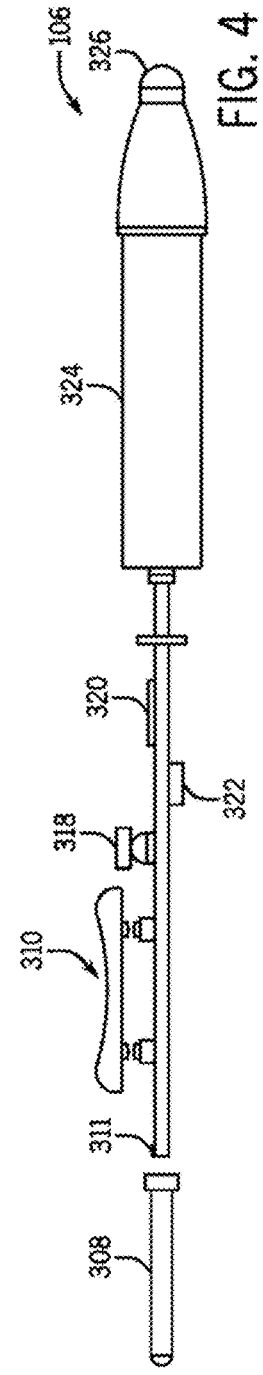
FIG. 4 is a schematic view of internal components of the stylus of FIG. 3, according to some implementations.

FIG. 3 is a side view of the stylus 106 according to some examples. FIG. 4 is a schematic view of internal components of the stylus 106 (with the outer housing 301 of the stylus 106 removed). The stylus 106 is generally shaped as a wand in the example of FIG. 3. They stylus 106 has an overall body 302. A retroreflective material can be applied to the outer surface of the body 302 substantially along the whole length of the body 302. "Substantially along a whole length" of the body of the input object can refer to greater than 50% of the whole length of the body of the input object. In other examples, the retroreflective material is not applied substantially to the whole length of the stylus 106, but instead, can be applied to an upper portion 304 and a bottom portion 306 of the stylus 106. Note that the upper portion 304 and bottom portion 306 can have a longer length, or shorter length, than depicted in the example of FIG. 3. The upper portion 304 and lower portion 306 can have respective retroreflective patterns that are different from each other.

The bottom part of the stylus 106 can be provided with a moveable plunger 308 (which is an example of the tip portion 107 of FIG. 1). The moveable plunger 308 can be a spring-loaded plunger that is moveable longitudinally along the length of the stylus 106 when the plunger 308 makes contact with the upper surface 112 of the surface structure 110. Movement of the plunger 308 can be detected by a plunger sensor 311, which can be an electrical switch sensor, an optical sensor, or any other type of sensor.

Application of pressure on the stylus 106 against the upper surface 112 can cause the plunger 308 to move longitudinally. Different pressures applied by a user can correspond to different movements of the plunger 308, which can be detected by the stylus 106. Different positions of the stylus 308 can be communicated in data transmitted from the stylus 106 to the electronic device 102. As an example, different pressures applied by a user that cause different longitudinal movements of the plunger 308 can correspond to different line widths drawn in a displayed image.

In examples according to FIGS. 3 and 4, a user-activatable button 310 can be provided, which can be depressed by a user. Depressing a portion 312 of the button 310 causes a first actuation of the button 310. Pressing a second portion 314 of the button 310 causes a second actuation of the button 310. Pressing a middle portion 316 of the button 310 causes a third actuation of the button 310. The different actuations can correspond to three different button inputs, in other examples, other types of user-activatable elements can be provided.

The stylus 106 also includes a light emitting diode (LED) indicator 318. FIG. 4 also shows a battery 324 included in the stylus 106 to provide power to the various components in the stylus 106.

The stylus 106 can also include an orientation sensor 322, such as an accelerometer, which can detect an orientation of the stylus 106 (e.g. vertical orientation, horizontal orientation, or another orientation between vertical and horizontal).

In addition, the stylus 106 includes a wireless interface 320 that can communicate wirelessly with the wireless interface 118 in the electronic device 102 of FIG. 1. Signals corresponding to activation of the plunger 308, signal corresponding to activation of the button 310, and measured data of the orientation sensor 322 can be communicated wirelessly by the wireless interface 320 to the electronic device 102.

The foregoing refers to an orientation of the stylus 106 where the plunger 308 is at the bottom portion of the stylus. In other examples, if the stylus 106 is to be used with a capacitive-based touch-sensitive surface (instead of or in addition to an image-based input system as discussed above), then a capacitive nib 326 of the stylus 106 can be considered to be at the bottom portion of the stylus 106. The capacitive nib 326 can be detected by a capacitive-based touch-sensitive surface.

Figure 3A:
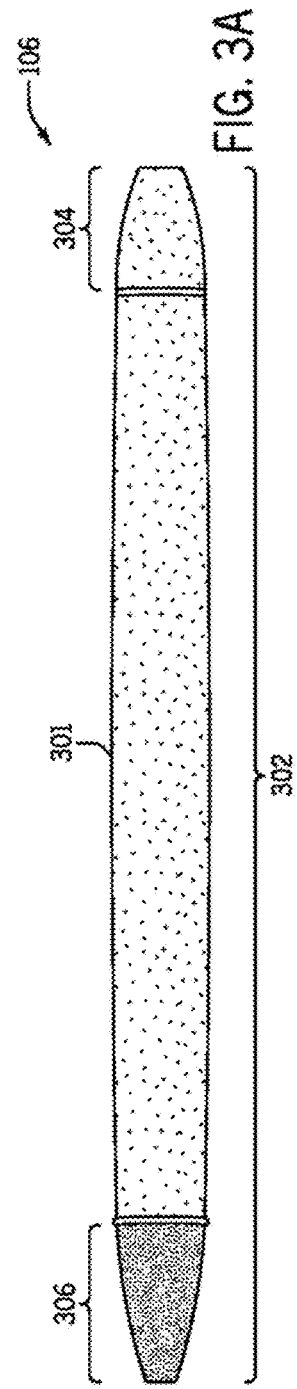
FIG. 3A is a side view of a stylus according to further implementations.

It is noted that some elements of the stylus 106 as shown in FIGS. 3 and 4 can be omitted in other examples. For example, FIG. 3A shows the stylus 106 according to further implementations without various elements of the stylus of FIG. 3.

Figure 5:
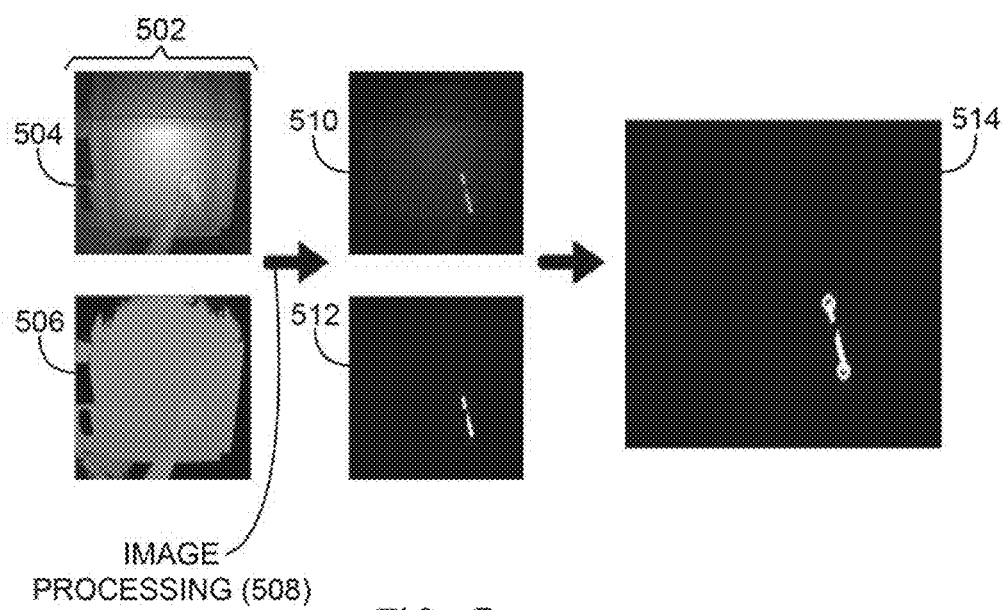
FIG. 5 is a schematic diagram of image processing of an image of a stylus as captured by an image capture device, according to some implementations.

FIG. 5 is a schematic diagram of image processing that can be performed by the input processing engine 114 according to some implementations. The input processing engine 114 receives data 502 provided by the image capture device 104, which can include an IR camera, for example. The IR camera provides a raw IR image 504, which depicts the stylus 106 as held by a user above the surface structure 110. The input data 502 further includes depth information 506, as captured by the depth sensor of the IR camera. The depth information 506 provides indications of the depth of the elements captured in the raw image 504.

The input processing element 114 applies image processing 508 to the input data 502 to identify a position of the stylus 106. The image processing 508 produces a processed image 510 that highlights the stylus 106 while removing the remainder of elements in the raw image 504, including the user's hand and the support structure 110. The depth information 506 is also converted by the image processing 508 to a depth image 512 that highlights the stylus 106.

The image processing 508 to highlight the stylus 106 is made more accurate due to use of the retroreflective material on the outer surface of the stylus 106

Combining the images 510 and 512 produces an output image 514 of the stylus 106 that includes 3D information, which can be used to determine the 3D position of the stylus 106.

Figure 6:
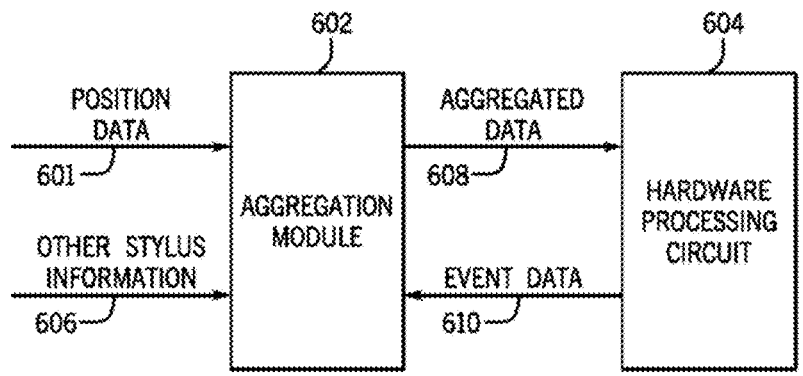
FIG. 6 is a schematic diagram of image processing of an image of a stylus as captured by an image capture device, according to further implementations.

FIG. 6 is a schematic diagram that shows further processing according to some implementations that can be performed by the input processing engine 114. An input (referred to as position data 601) to the process of FIG. 6 can be derived from the output image 514 of FIG. 5. In the example of FIG. 6, the input processing engine 114 includes an aggregation module 602 and a hardware processing circuit 604. The aggregation module 602 can include machine-readable instructions. In other examples, instead of using the arrangement depicted in FIG. 6, a different processing arrangement can be provided.

The position data 601, which provides a position of the stylus 106 in three dimensions, is received by the aggregation module 602. Other stylus information 606 from the stylus 106 is also received by the aggregation module 602. The other stylus information 606 can include information relating to activation of the plunger 308, information relating to activation of the button 310, and measurement data from the orientation sensor 322 (FIG. 3).

The aggregation module 602 aggregates the position data 601 and the other stylus information 606 to produce aggregated data 608, which can be provided to the hardware processing circuit 604. In some examples, the aggregated data 608 can be provided in Universal Serial Bus (USB) format to the hardware processing circuit 604.

In response to the aggregated data 608, the hardware processing circuit 604 produces event data 610 to represent the respective input event(s), such as Human Interface Design (HID) event data. The HID event data 610 is provided to the aggregation module 602, which can then process the input event(s).

Figure 7:
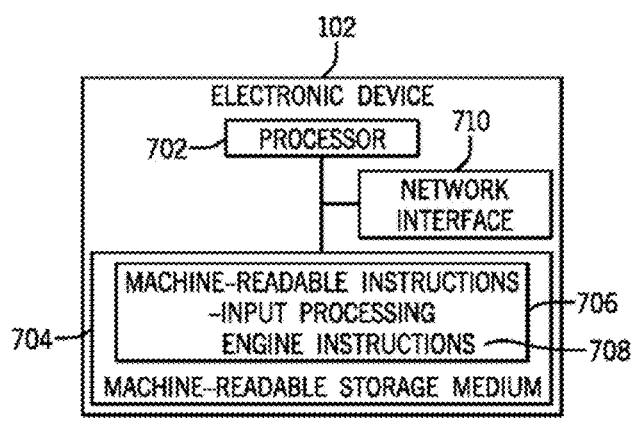
FIG. 7 is a block diagram of an example electronic device according to some implementations.

FIG. 7 is a block diagram of an example electronic device 102 according to some implementations. A processor can include a microprocessor, microcontroller, processor module or subsystem, programmable integrated circuit, programmable gate array, or another control or computing device. The electronic device 102 includes one or multiple processors 702, which is coupled to a non-transitory machine-readable storage medium (or storage media) 704.

The storage medium (or storage media) 704 can store machine-readable instructions 706, which can include input processing engine instructions 708 (instructions of the input processing engine 114).

The storage medium (or storage media) 704 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a system including a processor, data captured by an image capture device of an input object that has a first retroreflective pattern and a second, different retroreflective pattern on a surface of the input object, the input object comprising a housing and a plunger moveable in the housing and relative to the housing;
determining, by the system, a position of the input object in three dimensions based on the received data;
based on the determined position of the input object, determining, by the system, a region having a spatial relationship with respect to a portion of the input object;
based on the determined region, performing, by the system, unintended touch rejection with respect to a touch made with a touch-sensitive surface, wherein performing the unintended touch rejection comprises disregarding the touch made with the touch-sensitive surface;
receiving, by the system, an indication of movement of the plunger relative to the housing of the input object, wherein the movement of the plunger is responsive to interaction between the plunger and the touch-sensitive surface; and
aggregate data representing the movement of the plunger relative to the housing and position data representing the position of the input object to produce aggregated data for processing of an input event relating to the position of the input object and the movement of the plunger.

2. The method of claim 1, wherein determining the position of the input object is performed while the input object hovers above the touch-sensitive surface without contacting the touch-sensitive surface.

3. The method of claim 2, wherein determining the position of the input object while the input object hovers above the touch-sensitive surface is performed without any physical interaction between the input object and the touch-sensitive surface.

4. The method of claim 1, wherein a retroreflective material is provided substantially along a whole length of the input object, and wherein the retroreflective material includes the first retroreflective pattern and the second retroreflective pattern.

5. The method of claim 1, further comprising:
receiving, by the system, an indication of activation of a user-activatable element on the input object; and
causing, by the system, painting of a region of a displayed image with a particular color corresponding to a time interval during which the user-activatable element of the input object remains activated, based on the received indication.

6. The method of claim 1, wherein receiving the data captured by the image capture device of the input object comprises receiving the data captured by an infrared camera of the input object.

7. The method of claim 1, wherein the determined region is a region a specified distance from a tip portion of the input object, and the touch is a touch by another object different from the input object with the touch-sensitive surface.

8. A non-transitory machine-readable storage medium storing instructions that upon execution cause a system to:
receive data captured by an image capture device of an input object that has a first retroreflective pattern and a second, different retroreflective pattern on a surface of the input object;
generate, based on the received data, position data representing a position of the input object in three dimensions;
receive an indication of movement of a plunger of the input object, wherein the movement of the plunger is relative to a housing of the input object and is responsive to interaction between the plunger and a touch surface; and
aggregate the position data and data representing the movement of the plunger relative to the housing of the input object to produce aggregated data for processing of an input event relating to the position of the input object and the movement of the plunger.

9. The non-transitory machine-readable storage medium of claim 8, wherein the input object has a bottom portion and a top portion, wherein the first retroreflective pattern is proximate the bottom portion, and the second retroreflective pattern is proximate the top portion.

10. The non-transitory machine-readable storage medium of claim 8, wherein the instructions upon execution cause the system to:

receive, from a wireless communication interface of the input object, an indication of activation of a user-activatable button on the input object.

11. The non-transitory machine-readable storage medium of claim 8, wherein the indication of the movement of the plunger relative to the housing of the input object is received from a wireless communication interface of the input object.

12. The non-transitory machine-readable storage medium of claim 8, wherein the indication is responsive to detection of the movement of the plunger in the housing of the input object by a sensor of the input object.

13. The non-transitory machine-readable storage medium of claim 8, wherein the movement of the plunger comprises movement of the plunger in the housing of the input object.

14. A system comprising:
an input capture device to capture an image of an input object that has a first retroreflective pattern and a second, different retroreflective pattern on a surface of the input object, the input object comprising a housing and a plunger moveable in the housing and relative to the housing; and
a processor to:
receive data captured by the image capture device of the input object;
determine a position of the input object in three dimensions based on the received data that includes data relating to the first and second retroreflective patterns;
based on the determined position of the input object, determine a region having a spatial relationship with respect to a portion of the input object;
based on the determined region, perform unintended touch rejection with respect to a touch made with a touch-sensitive surface, wherein performing the unintended touch rejection comprises disregarding the touch made with the touch-sensitive surface;
receive an indication of movement of the plunger relative to the housing of the input object, wherein the movement of the plunger is responsive to interaction between the plunger and the touch-sensitive surface; and
aggregate data representing the movement of the plunger relative to the housing and position data representing the position of the input object to produce aggregated data for processing of an input event relating to the position of the input object and the movement of the plunger.

15. The method of claim 1, wherein the determined region is a region around a tip portion of the input object, and the touch is a touch by another object different from the input object with the touch-sensitive surface.

16. The method of claim 15, wherein the input object is a stylus, and the another object is a user's finger.

17. The system of claim 14, wherein the determined region is a region around a tip portion of the input object, and the touch is a touch by another object different from the input object with the touch-sensitive surface.

18. The system of claim 17, wherein the input object is a stylus, and the another object is a user's finger.

19. The system of claim 14, wherein the determined region is a region a specified distance from a tip portion of the input object, and the touch is a touch by another object different from the input object with the touch-sensitive surface.

* * * * *